(12) United States Patent
Greve

(10) Patent No.: US 12,187,542 B2
(45) Date of Patent: Jan. 7, 2025

(54) SPROCKET

(71) Applicant: Laitram, L.L.C., Harahan, LA (US)

(72) Inventor: Christopher G. Greve, Covington, LA (US)

(73) Assignee: Laitram, L.L.C., Harahan, LA (US)

( * ) Notice: Subject to any disclaimer, the term of this patent is extended or adjusted under 35 U.S.C. 154(b) by 58 days.

(21) Appl. No.: 18/033,482

(22) PCT Filed: Oct. 27, 2021

(86) PCT No.: PCT/US2021/056840
§ 371 (c)(1),
(2) Date: Apr. 24, 2023

(87) PCT Pub. No.: WO2022/108720
PCT Pub. Date: May 27, 2022

(65) Prior Publication Data
US 2024/0017930 A1    Jan. 18, 2024

Related U.S. Application Data

(60) Provisional application No. 63/116,626, filed on Nov. 20, 2020.

(51) Int. Cl.
*B65G 23/06* (2006.01)
(52) U.S. Cl.
CPC .................... *B65G 23/06* (2013.01)
(58) Field of Classification Search
CPC ...................................... B65G 23/06
USPC .................................. 198/832, 834
See application file for complete search history.

(56) References Cited

U.S. PATENT DOCUMENTS

| | | | | |
|---|---|---|---|---|
| 3,068,711 | A | * 12/1962 | Francois | B62D 55/0885 474/901 |
| 5,170,883 | A | 12/1992 | Ledet et al. | |
| 5,263,575 | A | * 11/1993 | Ledet | B65G 23/06 198/834 |
| 5,316,522 | A | * 5/1994 | Carbone | F16H 55/12 474/903 |
| 5,888,158 | A | 3/1999 | Wilcher | |
| 6,136,191 | A | * 10/2000 | Gribble | B01D 29/6484 210/523 |
| 9,415,943 | B2 | 8/2016 | Carrara et al. | |
| 2010/0263992 | A1 | 8/2010 | Jones et al. | |
| 2015/0284188 | A1* | 10/2015 | Voigt | B65G 17/44 198/834 |

FOREIGN PATENT DOCUMENTS

| | | |
|---|---|---|
| JP | 2014-025588 A | 2/2014 |
| KR | 10-2157485 B1 | 9/2020 |

* cited by examiner

*Primary Examiner* — James R Bidwell
(74) *Attorney, Agent, or Firm* — James T. Cronvich

(57) ABSTRACT

A sprocket having a series of circumferentially spaced tooth blades bridging the peripheries of two axially spaced outer rings. An optional locking ring between the outer rings provides additional support for the tooth blades or the outer rings and helps lock the tooth blades in place. The sprocket can be a split sprocket for easier installation onto and removal from a shaft.

27 Claims, 5 Drawing Sheets

SPROCKET

BACKGROUND

The invention relates to toothed sprockets for conveyor belts.

Modular plastic conveyor belts and sprockets are frequently used in the food industry to convey products. When run at high speeds, such as over 500 ft/min, plastic belts and their plastic sprockets wear at the drive faces of the sprockets and the driven faces of the belts. As these faces wear, belt-sprocket engagement deteriorates, and the belt starts to skip teeth resulting in uneven conveying speeds. Eventually the belt, the sprockets, or both have to be replaced.

SUMMARY

One version of a sprocket embodying features of the invention comprises first and second outer rings each having a radially outer periphery and central hub defining an axial bore. The axial bores are aligned. Spacers between the first and second outer rings set an axial separation distance between the first and second outer rings. Tooth blades are attached to and span the outer peripheries of the first and second outer rings at circumferentially spaced tooth positions around the outer peripheries.

Another version of a sprocket embodying features of the invention comprises outer rings each having a radially outer periphery and central hub defining an axial bore. Spacers between the outer rings set an axial separation distance between the outer rings. Tooth blades are attached to and span the outer peripheries of the outer rings at circumferentially spaced tooth positions around the outer peripheries. Locking rings abutting the outer rings bolster the outer rings and have radially outer peripheries. The locking rings have a plurality of circumferentially spaced and circumferentially extending protrusions on their radially outer peripheries, and the tooth blades have holes receiving the protrusions to lock the tooth blades.

DETAILED DESCRIPTION

Figure 1:
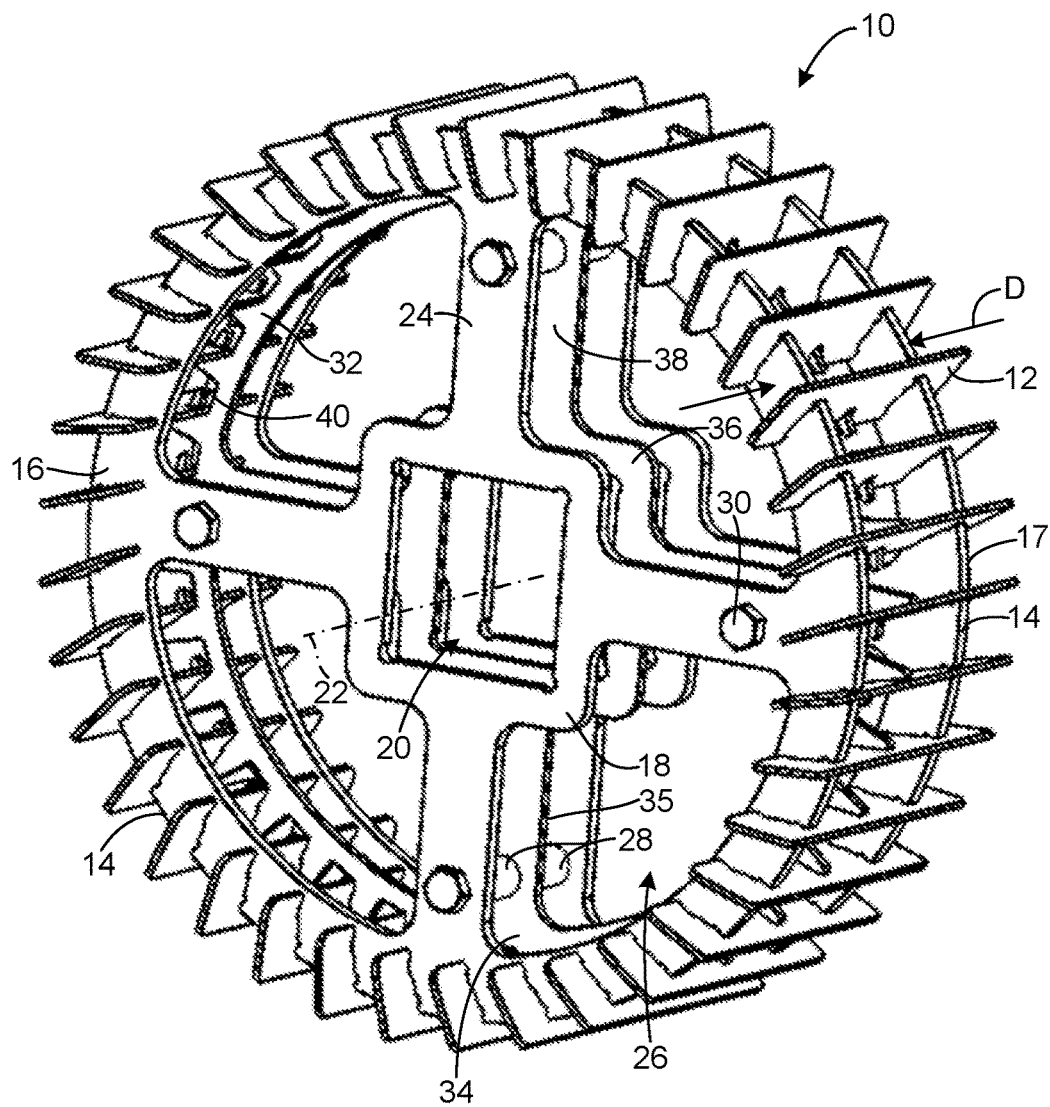
FIG. 1 is an isometric view of one version of a sprocket embodying features of the invention.

One version of a sprocket embodying features of the invention is shown in FIGS. 1-4. The sprocket 10 is constructed of a series of tooth blades 12 circumferentially spaced around the peripheries 14 of two outer rings 16, 17. The spacing from tooth blade to tooth blade defines the sprocket's pitch. Each outer ring 16, 17 has a central hub 18 defining an axial bore 20 perpendicular to an axis of rotation 22 of the sprocket 10. Spokes 24 radiate outward of the hub 18 to the outer peripheries 14 of the outer rings 16, 17. Windows 26 formed between consecutive spokes 24 aid in cleaning the sprocket 10. Spacers 28 separate the outer rings 16, 17 from each other at an axial separation distance D. Fasteners 30, such as bolts and nuts, hold the sprocket together. The bolts extend through holes (not shown) in the outer rings 16, 17 and through the hollow spacers 28 from one outer ring to the other. The nuts are tightened to the ends of the bolts. An optional locking ring 32 helps support the tooth blades 12 between the two radially outer rings 16, 17. Like the outer rings 16, 17, the locking ring 32 has a central hub 36 and bore and radial spokes 38 extending outward from the hub to an outer periphery 40. The outside diameter of the outer rings 16, 17 is greater than the outside diameter of the locking ring 32. When the locking ring 32 is used, the spacers 28 are disposed between the outer ring 16 and a facing side face 34 of the locking ring and between the outer ring 17 and an opposite facing side face 35 of the locking ring. As shown in FIG. 1, the spacers 28 and fasteners 30 fasten the rings 16, 17, 32 at their spokes 24 with their bores 20 axially aligned. The bores 20 shown in the examples are square. When the bores 40 are aligned, their four sides are aligned to admit a drive or idle shaft with a square cross section. Other polygonal bore shapes can be used, as well as circular bores with a keyway receiving a key on the shaft.

Figure 2:
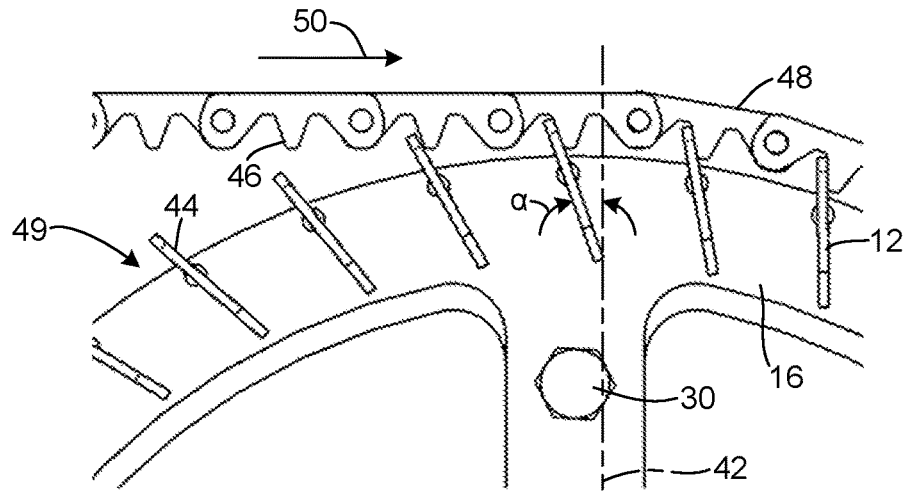
FIG. 2 is an enlarged view of a portion of the sprocket of FIG. 1 driving a conveyor belt.

As shown in FIG. 2, the tooth blades 12 define planes oblique to the radial direction 42, i.e., the direction from the axis of rotation to the periphery of the outer ring 16. The oblique angle α is shown in FIG. 2. The tooth blades 12 have drive faces 44 that engage driven faces 46 on the inner side of a conveyor belt 48 to drive the belt in a conveying direction 50 as the sprocket rotates clockwise in FIG. 1 or 2. Spaces 49 between consecutive tooth blades 12 provide access for cleaning the sprocket.

Figure 3:
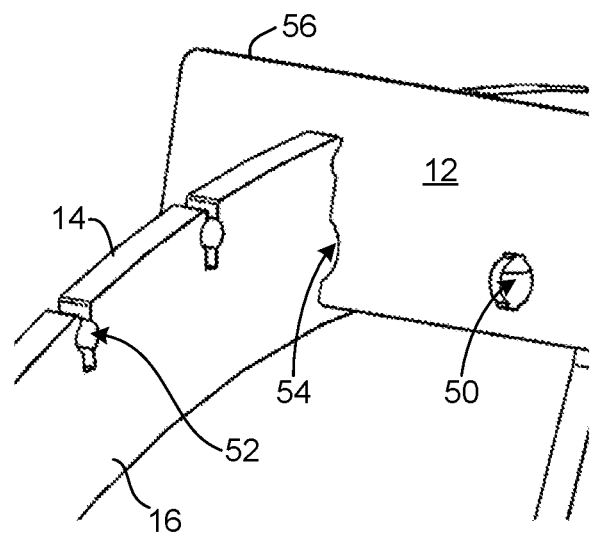
FIG. 3 is an enlarged view of a portion of the sprocket of FIG. 1 showing the attachment of a tooth blade to an outer ring.

FIG. 3 shows slots 52 opening onto the outer periphery 14 of the outer ring 16. The slots 52 mate with slots 54 in the tooth blades 12 to hold them in circumferentially spaced tooth positions. When mounted in place, the tooth blades 12 span and extend axially outward past the outer rings 16, 17. An outer edge 56 of the tooth blades 12 extends radially outward of the peripheries 14 of the outer rings 16, 17.

Figure 4:
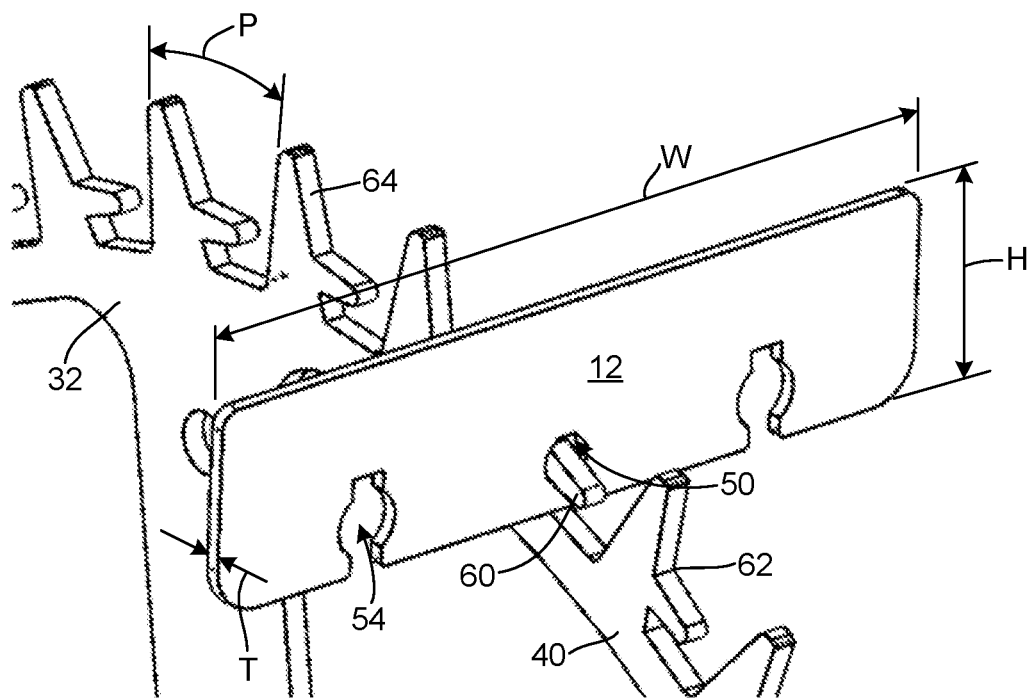
FIG. 4 is an enlarged view of a portion of the sprocket of FIG. 1 showing a tooth blade locked by a locking ring.

As shown in FIG. 4, the tooth blade 12 is a rectangular vane with a height H and a width W, each greater than its thickness T. The tooth blade 12 has a hole 58 through its thickness T that receives a protrusion 60 that extends circumferentially from a tooth seat 62 on the periphery 40 of the locking ring 32. The seats 62 are spaced apart by the sprocket pitch P. The tooth seats 62 have seat backs 64 against which the tooth blades 42 rest. The seat backs 64 define with the radial direction 42 the angle α of FIG. 2.

The sprocket 10 is assembled as follows. First, the two outer rings 16, 17 are arranged with their bores 20 aligned. Then some of the tooth blades 12 are installed across the two outer rings 16, 17 at the tooth positions. Before too many of the blades 12 are installed, the locking ring 32 is positioned between the two outer rings 16, 17. The locking ring 32 is rotated just out of alignment with the outer rings 16, 17 so that the protrusions 60 on the tooth seats 62 don't interfere with the installation of the remaining tooth blades 12. Once all the tooth blades 12 are installed bridging the two outer rings 16, 17, the locking ring 32 is rotated so that the protrusions 60 penetrate the holes 50 in the blades 12 until the blades rest against the seat backs 64. In that condition the bores of the locking ring 32 and the two outer rings 16, 17 are aligned, along with the fastener holes. The spacers 28 and the fasteners 30 are then installed locking the tooth blades 12 in place with the locking ring 32. The blades 12 are removed for replacement by reversing the process just described.

As an alternative, the tooth blades 12 can be welded to the outer ring 16, 17 and the locking ring 32. If the locking ring 32 isn't needed to support the blades 12, it can be omitted from the sprocket 10. For extended wear life the sprocket is made out of metal, such as stainless or carbon steel, which can be laser-cut for precision. And if a wide sprocket is needed, more than three rings can be used to provide adequate support for the tooth blades. The large open area provided by the windows and the spaced tooth blades facilitates cleaning of the sprocket.

Figure 5:
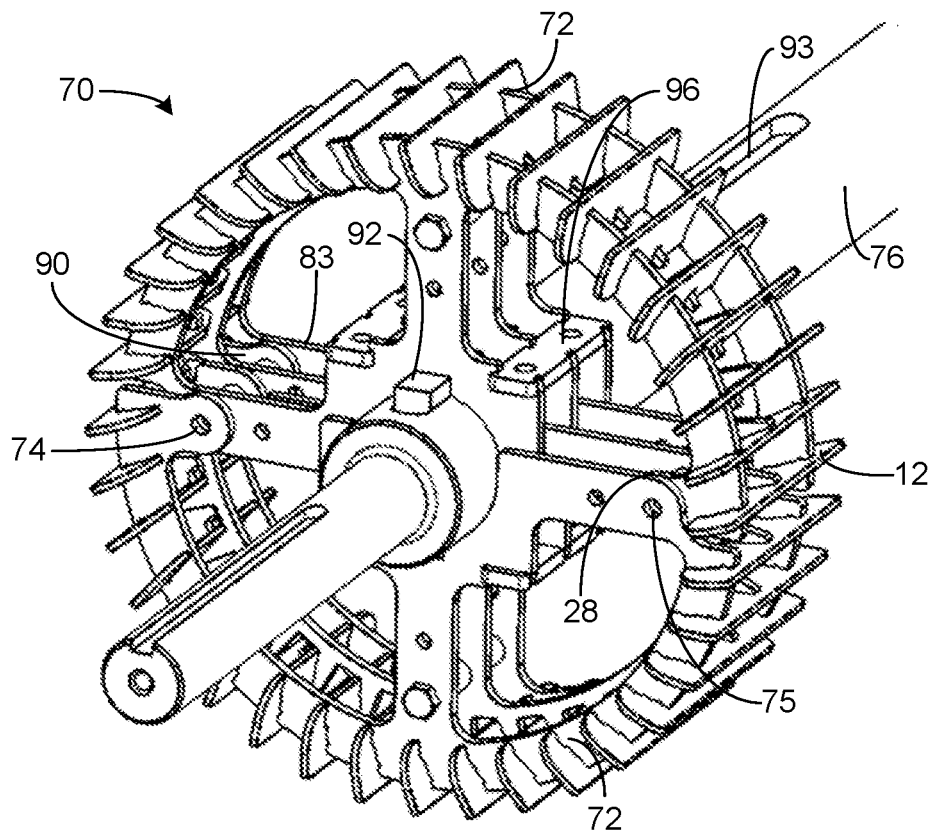
FIG. 5 is an isometric view of one version of a split sprocket embodying features of the invention shown mounted on a shaft.
Figure 6:
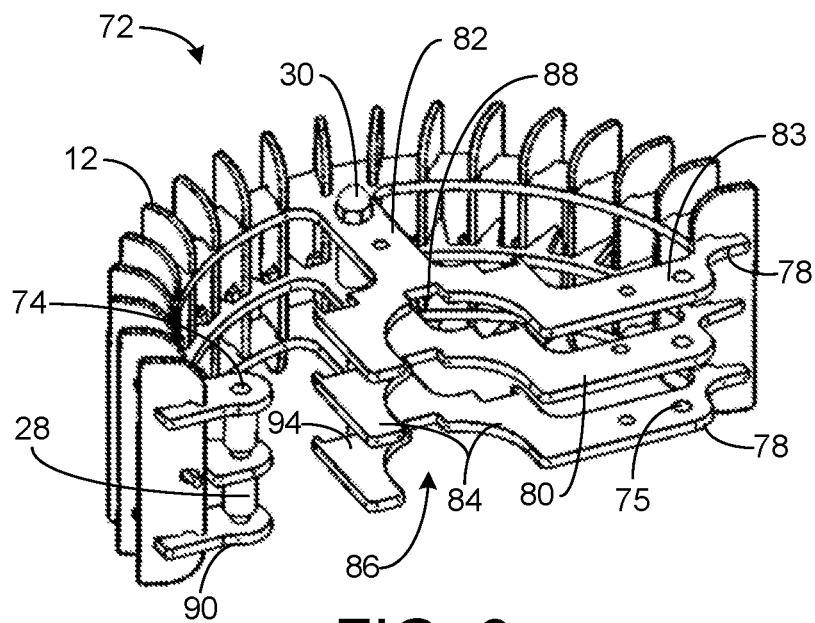
FIG. 6 is an isometric view of one half of the split sprocket of FIG. 5.

One version of a split sprocket having similar features to the sprocket 10 of FIG. 1 as well as other features is shown in FIGS. 5 and 6. The split sprocket 70 comprises two sprocket halves 72 that can be bolted together through aligned attachment holes 74, 75 in each sprocket half. Unlike the sprocket 10 of FIG. 1, the split sprocket 70 can be installed on or removed from a shaft 76 without requiring the shaft to be removed from bearing blocks or gear boxes in the conveyor frame. Instead, each sprocket half 72 is introduced radially onto the shaft 76. Then the two sprocket halves 72 are bolted together through the attachment holes 74, 75.

Each sprocket half 72 includes two outer half rings 78, an optional locking half ring 80 (a locking half ring), and peripheral tooth blades 12. Each outer half ring 78, as well as the locking half ring 80, has two spokes 82, 83 extending radially from a central hub portion 84. The spokes 82 at the closed end of the hub portion 84 of the outer and locking half rings 78, 80 are aligned and spaced apart by spacers 28 fastened together by bolts 30 and nuts to form the sprocket half 72. The hub portion 84 of each sprocket half 72 defines a circular half bore 86 with a key slot 88 for mounting on the circular shaft 76. But the bore could be a square bore as in FIG. 1 or another bore shape. Likewise, the bore in the sprocket of FIG. 1 could be circular or another shape. The tooth blades 12 are attached to the peripheries of the sprocket halves 72 in the same way as for the sprocket 10 of FIGS. 1-4. In this example, the locking half rings 80 of each sprocket half 72 are identical, and the outer half rings 78 of each sprocket half are identical. But the outer rings and the locking rings could be split along lines such that each half ring differs from the other or is not even an actual half ring, but that the two "ring halves" are, for example, a "one-third ring" and a "two-thirds ring."

The two sprocket halves 72 are mounted on the shaft 76 by first moving them radially onto the shaft. The key slots 88 of one of the sprocket halves 72 are positioned to receive a shaft key 92 extending out of a shaft keyway 93. (The other sprocket half 72 can also have key slots 88 for a shaft with two shaft keys 92.) The two sprocket halves 72 are slightly axially offset. The attachment holes 75 in the spokes 83 at the open ends of the hub portions 84 of each sprocket half 72 are aligned with the attachment holes 74 in overlapping spoke stubs 90 of the other sprocket half. The spoke stubs 90 extend radially inward from the peripheries of the half rings 78, 80 of the sprocket halves 72 toward the hub portions 84. Bolts through the aligned attachment holes 74, 75 and through spacers 28 and into nuts fasten the two sprocket halves 72 together on the shaft 76. The hub portions 84 of the fastened sprocket halves 72 transform the two half bores 86 into a circumferentially closed bore receiving the shaft 76. Aligned grooves 94 on the outer sides of the hub portions 84 of each half ring 78, 80 receive optional axial stiffening plates 96 bolted into or otherwise fastened to the hub portions to provide additional stiffness.

Figure 7:
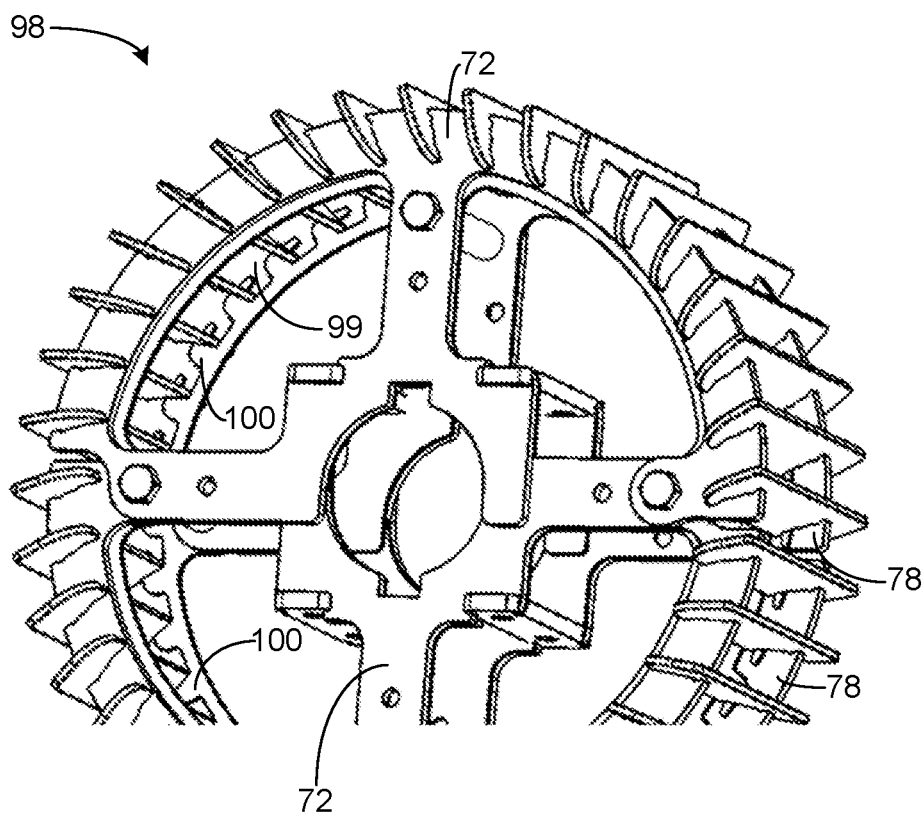
FIG. 7 is an isometric view of a major portion of another version of a split sprocket.
Figure 8:
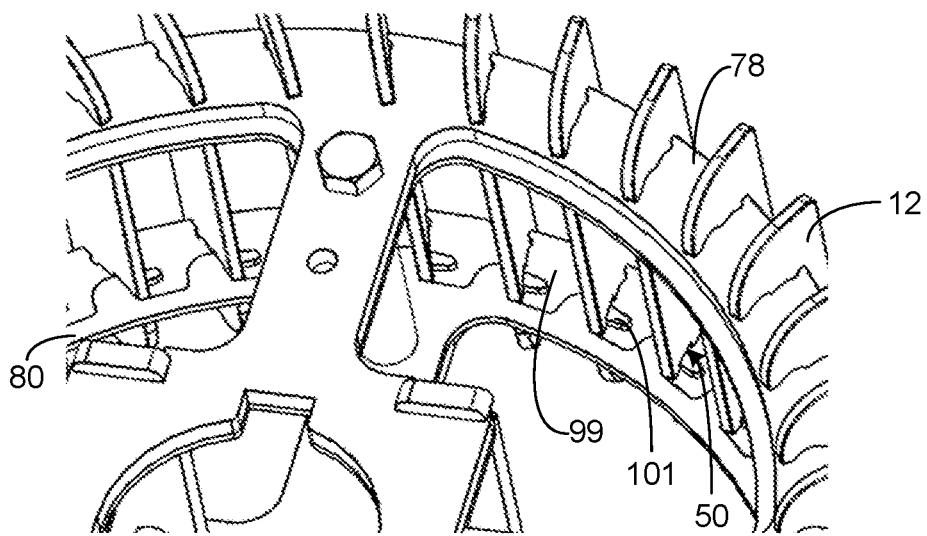
FIG. 8 is an enlarged view of a portion of the split sprocket of FIG. 7.

Another version of a split sprocket is shown in FIGS. 7 and 8. The split sprocket 98 shown by way of example is constructed generally of the same parts as the split sprocket 70 of FIG. 5, but with some differences. One difference is that the locking half rings 100 abut axially interior faces 99 of the two outer half rings 78 to lap the outer half rings. A second difference is that the locking half rings 100 don't include the seat backs 64 of the locking half ring 80 of FIG. 6. A third difference is that the number and lengths of the spacers are selected to accommodate the different configuration. By lapping the outer half rings 78, the locking half rings 100 bolster the outer half rings, which is helpful in axially wide or heavily loaded sprockets. Protrusions 101 on the peripheries of the locking half rings 100 are received in the holes 50 of the tooth blades 12 to lock the tooth blades in place.

Figure 9:
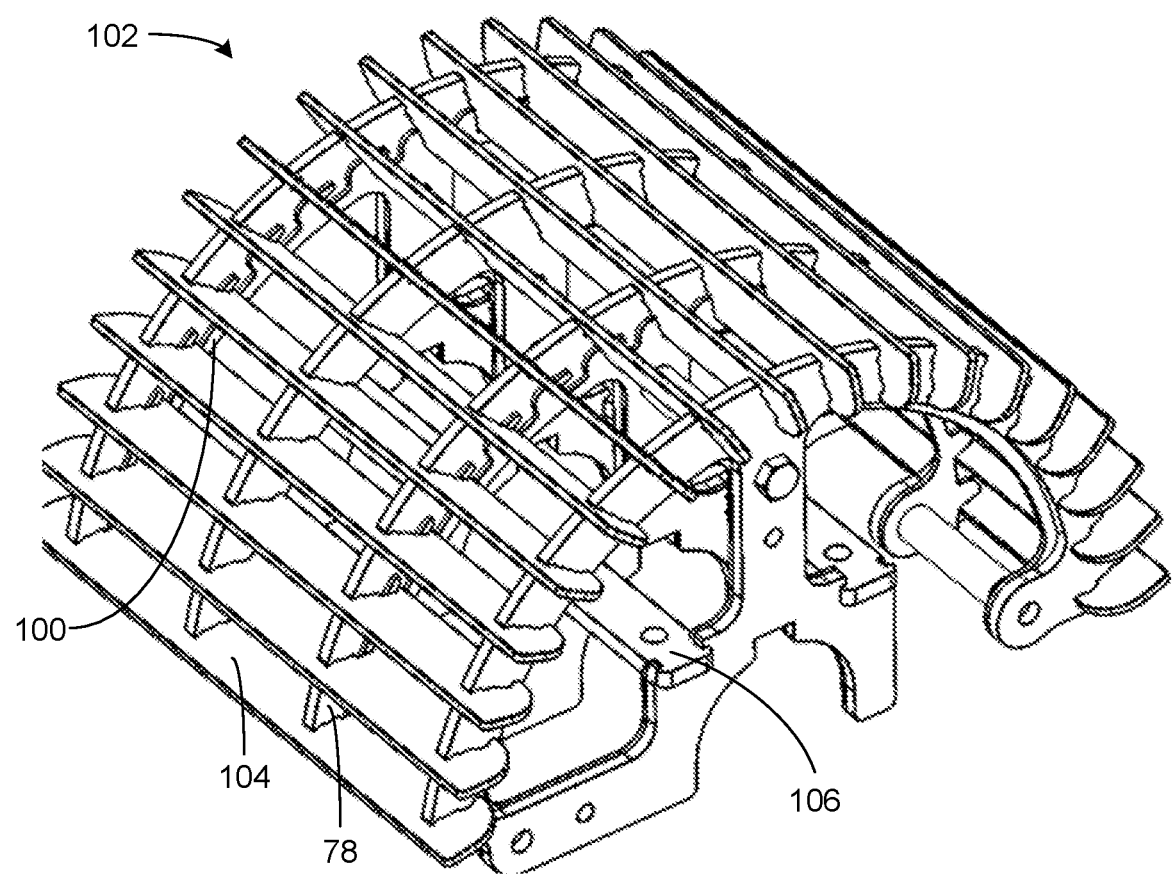
FIG. 9 is an isometric view of a split-sprocket half of a wider version of the split sprocket of FIG. 7.

FIG. 9 shows a sprocket half 102 of a wider version of the split sprocket of FIG. 7. In this example the sprocket half 102 includes four outer half rings 78, each abutted by a lapping locking half ring 100. The wider sprocket half 102 also has axially elongated tooth blades 104 and stiffening plates 106 corresponding to the axially elongated sprocket half 102. Full-circle locking rings with peripheries like those of the locking half rings 80 of FIG. 9 can be used in a similar way in the sprocket 10 of FIG. 1 to lap the outer rings 16, 17 and bolster them.

What is claimed is:

1. A sprocket comprising:
a first outer ring having a radially outer periphery and central hub defining an axial bore;
a second outer ring having a radially outer periphery and central hub defining an axial bore aligned with the axial bore of the first outer ring;
spacers between the first and second outer rings to set an axial separation distance between the first and second outer rings;
tooth blades attached to and spanning the outer peripheries of the first and second outer rings at circumferentially spaced tooth positions around the outer peripheries.

2. The sprocket as claimed in claim 1 wherein the first and second outer rings have spokes extending radially from the central hubs to the outer peripheries defining windows between circumferentially consecutive spokes.

3. The sprocket as claimed in claim 1 wherein the bores of the first and second outer rings are square.

4. The sprocket as claimed in claim 1 wherein the first and second outer rings have slots opening onto the outer peripheries at the tooth positions and wherein the tooth blades have slots that mate with the slots of the first and second outer rings to position the tooth blades at the tooth positions.

5. The sprocket as claimed in claim 1 wherein the tooth blades define planes oblique to the radial direction.

6. The sprocket as claimed in claim 1 wherein the first and second outer rings have axially outer faces and wherein the tooth blades extend axially outward of the axially outer faces.

7. The sprocket as claimed in claim 1 wherein the tooth blades are welded to the first and second outer rings.

8. The sprocket as claimed in claim 1 wherein the tooth blades are rectangular vanes with a height, a width, and a thickness, wherein the thickness is less than the height and less than the width.

9. The sprocket as claimed in claim 1 comprising a locking ring having a radially outer periphery and a central hub defining an axial bore, wherein the locking ring is positioned between the first and second outer rings.

10. The sprocket as claimed in claim 9 wherein the locking ring has tooth seats at circumferentially spaced locations on its outer periphery, wherein the tooth seats support the tooth blades between the first and second outer rings.

11. The sprocket as claimed in claim 10 wherein the tooth seats have seat backs arranged at an angle to the radial direction, wherein the tooth blades rest against the seat backs at an angle oblique to the radial direction at the tooth positions.

12. The sprocket as claimed in claim 9 wherein the locking ring has circumferentially extending protrusions and wherein the tooth blades have holes therethrough receiving the protrusions to lock the tooth blades in place when the axial bore of the locking ring is aligned with the axial bores of the first and second outer rings.

13. The sprocket as claimed in claim 9 wherein the spacers are disposed between the first outer ring and a first side face of the locking ring and between the second outer ring and an opposite second side face of the locking ring.

14. The sprocket as claimed in claim 1 comprising fasteners extending from the first outer ring to the second outer ring and wherein the spacers are hollow to receive the fasteners, wherein the fasteners retain the first and second outer rings separated by the axial separation distance.

15. The sprocket as claimed in claim 1 comprising one or more locking rings disposed between the first and second outer rings.

16. The sprocket as claimed in claim 15 wherein some of the spacers space the one or more locking rings axially from the first outer ring and the second outer ring.

17. The sprocket as claimed in claim 15 comprising a first locking ring lapping the first outer ring and a second locking ring lapping the second outer ring.

18. The sprocket as claimed in claim 15 wherein the first and second outer rings, the one or more locking rings, and the tooth blades are made of steel.

19. The sprocket as claimed in claim 1 wherein the first outer ring and the second outer ring are each formed by first and second outer half rings.

20. The sprocket as claimed in claim 19 wherein the first and second outer half rings are axially offset from each other.

21. The sprocket as claimed in claim 19 comprising one or more locking rings formed by first and second locking half rings disposed between the first and second outer half rings.

22. The sprocket as claimed in claim 21 wherein some of the spacers space the one or more locking half rings axially from the first outer half ring and the second outer half ring.

23. The sprocket as claimed in claim 21 comprising a first locking half ring lapping the first outer half ring and a second locking half ring lapping the second outer half ring.

24. The sprocket as claimed in claim 19 comprising stiffening plates extending axially from the central hub of the first outer ring to the second outer ring.

25. The sprocket as claimed in claim 1 comprising additional outer rings and a plurality of locking rings abutting the first, second, and additional outer rings.

26. The sprocket as claimed in claim 1 wherein the sprocket comprises two identical sprocket halves.

27. The sprocket as claimed in claim 1 wherein the tooth blades each have an outer edge radially outward of the outer peripheries of the first and second outer rings.

* * * * *